United States Patent [19]
Walters

[11] Patent Number: 5,442,813
[45] Date of Patent: Aug. 15, 1995

[54] RADIOTELEPHONE

[75] Inventor: Eckhard Walters, Röthenbach, Germany

[73] Assignee: U.S. Philips Corporation, New York, N.Y.

[21] Appl. No.: 179,407

[22] Filed: Jan. 10, 1994

[30] Foreign Application Priority Data

Jan. 9, 1993 [DE] Germany ............ 43 00 433.4

[51] Int. Cl.⁶ .............................. H04B 1/38
[52] U.S. Cl. ....................... 455/89; 455/345; 455/350; 379/389
[58] Field of Search ............ 455/89, 90, 78, 350, 455/345, 346; 379/389, 390, 419

[56] References Cited

U.S. PATENT DOCUMENTS

| | | | |
|---|---|---|---|
| 4,056,696 | 11/1977 | Meyerle et al. | 379/419 |
| 4,625,083 | 11/1986 | Poikela | 379/389 |
| 5,121,426 | 6/1992 | Baumhauer, Jr. et al. | 379/390 |
| 5,323,458 | 6/1994 | Park et al. | 379/389 |

FOREIGN PATENT DOCUMENTS 3009483 9/1981 Germany.

*Primary Examiner*—Edward F. Urban
*Attorney, Agent, or Firm*—Leroy Eason

[57] ABSTRACT

A radiotelephone includes a speaker and at least one microphone, and is incorporated with the sun visor assembly of a vehicle. The speaker is included in the visor so as to radiate from the narrow side thereof which faces an occupant of the vehicle. The microphones are supported on an axially rotatable support rod which adjoins the opposite side of the sun visor and to which the sun visor is coupled so as to permit tilting thereof causing axial rotation of the support rod. The coupling is such that upward/downward tilting of the sun visor causes an opposite tilting of the main reception path between the microphones and the occupant of the vehicle, so that acoustic screening of the microphones by the sun visor cannot occur regardless of how the sun visor may be tilted.

4 Claims, 2 Drawing Sheets

RADIOTELEPHONE

BACKGROUND OF THE INVENTION

1. Field of the Invention

The invention relates to a radiotelephone with at least one loudspeaker and at least one microphone which have been integrated into a sun visor arrangement.

2. Description of the Related Art

German "Offenlegungsschrift" DE 30 09 483 A1 (document laid open to public inspection) discloses a radiotelephone which comprises a separate operating device. It is provided for mobile use in motor vehicles. The operating device of the radiotelephone comprises among other elements a microphone and a loudspeaker. This operating device is incorporated into the sun visor of a motor vehicle. The use of the radiotelephone, i.e. the operating device, however, is only possible when the sun visor has been hinged down. In the hinged-up state of the sun visor, the operating device with its operating elements is not accessible to the driver of the vehicle, the speaker or listener. In addition, the loudspeaker and the microphone are acoustically screened from the driver by the sun visor in that case.

SUMMARY OF THE INVENTION

The invention accordingly has for its object to improve a radiotelephone for mobile use in motor vehicles, whose individual elements have been integrated into a sun visor of the vehicle, to such an extent that utilization of the radiotelephone is possible in all positions of the sun visor.

This object is achieved in that the loudspeakers incorporated in the sun visor radiate from the narrow side of the sun visor facing the speaker/listener and in that the microphones are provided close to the narrow side of the sun visor facing away from the speaker/listener.

A sun visor has two large-area flat surfaces bounded by four small-area narrow sides. It is known from the prior art to incorporate a loudspeaker or a microphone of a radiotelephone in a sun visor such that the main radiation or main reception direction is perpendicular to the two flat surfaces of the sun visor.

In such an arrangement, however, there will be an acoustic screening of the loudspeaker or microphone from the speaker/listener present in the vehicle by the sun visor when the latter is either in the hinged-up or in the hinged-down position. In such a position of the sun visor, where it screens the loudspeaker or microphone from the speaker/listener acoustically, the achievable transmission quality is unsatisfactory. In the arrangement according to the invention, one or several loudspeakers is/are integrated into the sun visor in such a manner that they radiate from the narrow side of the sun visor facing the speaker/listener. Flat piezoelectric foil loudspeakers are particularly suitable for this application. Loudspeakers which are incorporated into a sun visor in this manner can radiate unhampered into the interior of the vehicle in any position of the sun visor. A further provision is that one or several microphones is/are arranged close to the opposite narrow side of the sun visor. It is ensured thereby that the feedback from a loudspeaker into a microphone is small. This is particularly advantageous when the arrangement is used in a hands-free device. The microphones may be provided at the opposed narrow side of the sun visor, at the sun visor support, or alternatively at a separate fastening device. The use of several microphones is advantageous because this renders it possible to equip the radiotelephone with noise suppression. The greater the number of microphones used, the more effective a noise suppression system will be.

An embodiment of the invention is characterized in that the microphones are supported on a supporting member which is coupled to the sun visor.

As a rule, the microphones arranged close to the narrow side of the sun visor facing away from the speaker/listener are at only a very small distance from the sun visor. The main reception direction of the microphones in this case intersects the sun visor over a wide rotational range of the sun visor. The screening action of the sun visor resulting therefrom hampers the sound reception by the microphones. In order to adapt the positions of the microphones to the position of the sun visor, it is advantageous to provide the microphones on a member coupled to the sun visor. When the sun visor is pivoted, the position of the microphones can thus be adapted. The screening action of the sun visor is reduced and the acoustic coupling between the microphones and the speaker/listener is improved in this manner.

A further embodiment of the invention is characterized in that the supporting member is rotatably journalled and carries out a rotary movement opposed to the pivoting direction of the sun visor as a result of the coupling between the sun visor and the supporting member.

The positions of the sun visor can be roughly subdivided into three angular ranges: the sun visor may occupy a position directed upwards, directed towards the speaker/listener, or directed downwards. When the sun visor is directed upwards, i.e. has been hinged up, the microphones must have a downward main reception direction in order that an acoustic screening of the speaker/listener from the microphone by the sun visor is avoided. When the sun visor is in a downward angular position, the main reception direction of the microphones must be upward. The main reception direction of the microphones in this case lies higher than the angle of the main reception direction of the microphones in the case of a direct aiming at the hearer/listener. It is advantageous for facilitating an adjustment of the microphones in a direction adapted to the position of the sun visor to journal the supporting member to which the microphones are fastened with a rotation possibility. When the coupling between the supporting member and the sun visor is so constructed that the pivoting of the sun visor and the rotation of the supporting member with the microphones take place in opposite directions, it can be ensured that the microphones are screened by the sun visor to a slight extent only with the sun visor hinged up and hinged down.

A further embodiment of the invention is characterized in that the supporting member traverses an angular range, within which the main reception direction of the microphones intersects the sun visor, with a snap-type movement during pivoting of the sun visor.

When both the sun visor and the main reception direction of the microphones are directed towards the speaker/listener, the main reception direction of the microphones lies in the same plane with the sun visor. Since the microphones are normally provided close to the sun visor, a strong screening effect of the microphones from the speaker/listener by the sun visor would result in such a position. A downgraded reception quality of the microphones would be the result. This unfavourable position of the microphones is avoided in that they cross this angular range by means of a snap-type movement. When the sun visor traverses the angle in which it points at the speaker/listener, in upward direction, the member with the microphones will perform a snap-type movement such that the main reception direction of the microphones is rotated into a lower angular range. When the sun visor traverses the position in which it points at the speaker/listener, in downward direction, then the microphones, i.e. the main reception direction thereof, are moved into an upper angular position. A suitable upper or lower position of the microphones is obtained in that the main reception direction of the microphones just fails to intersect the sun visor. Triggering of the snap-type movement of the fastening member with the microphones is advantageously achieved at the moment when the sun visor is moved through a plane in which it is directed at the speaker/listener. In this manner the screening effect of the sun visor is minimized in a central position of the sun visor. When the limits of the angular range crossed by the microphones in a snap-type movement are so chosen that the screening of the microphones by the sun visor is small even with the sun visor fully hinged down or fully hinged up, then the technical measures described suffice for achieving a satisfactory acoustic coupling between the microphones and the speaker/listener throughout the pivoting range of the sun visor.

A further embodiment of the invention is characterized in that the sun visor and the supporting member carrying the microphones are coupled by a mechanical transmission.

A coupling between the sun visor and the supporting member, to which one or several microphones is/are fastened, is possible in principle both by electrical and by mechanical means. An electrical realisation could be, for example, a coupling by means of an electric motor which is controlled by an electronic circuit, in which arrangement the electronic circuit controls the positions of the sun visor and the supporting member. A mechanical transmission may be favourably realised in a much simpler manner. Thus opposite movements of the sun visor and supporting member may be very easily realised, for example, by means of a transmission with two gearwheels.

A further embodiment of the invention is characterized in that the supporting member is a rod.

As described above, the microphones should be provided according to the invention close to the narrow side of the sun visor facing away from the speaker/listener. The supporting member must support all microphones as well as contribute to the coupling between the microphones and the sun visor. The supporting member can be constructed in a simple manner by means of a rod. The microphones can be readily fastened thereto, for example, by a clamp or screw connection.

BRIEF DESCRIPTION OF THE DRAWINGS

Embodiments of the invention will be explained in more detail with reference to the annexed Figures, in which.

DETAILED DESCRIPTION

Figure 1:
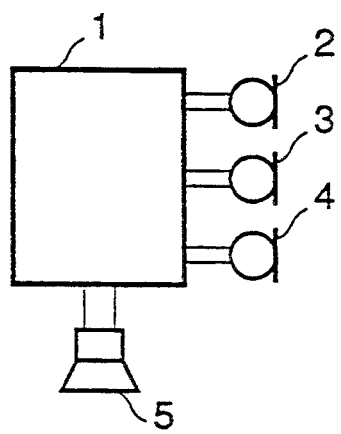
FIG. 1 shows a radiotelephone with a loudspeaker and three microphones.

The sketch of FIG. 1 represents a radiotelephone with a transceiver 1, three microphones 2, 3, 4, and a loudspeaker 5. The microphones and the loudspeaker are arranged outside the transceiver housing. Such a radiotelephone is designed to be used in vehicles. The use of several microphones renders it possible to realise a noise suppression system known per se. The adverse influence of wind and motor noises can be reduced by this. The transceiver 1 may be built in, for example, into the instrument panel or between the passenger seats. An advantageous location for incorporating the microphones 2, 3, 4 and the loudspeaker 5 is the sun visor. A good acoustic coupling between the microphones and the driver of the vehicle, i.e. the speaker/listener, is achieved in this manner. In addition, this location for incorporation is normally not occupied by any other technical devices.

Figure 2:
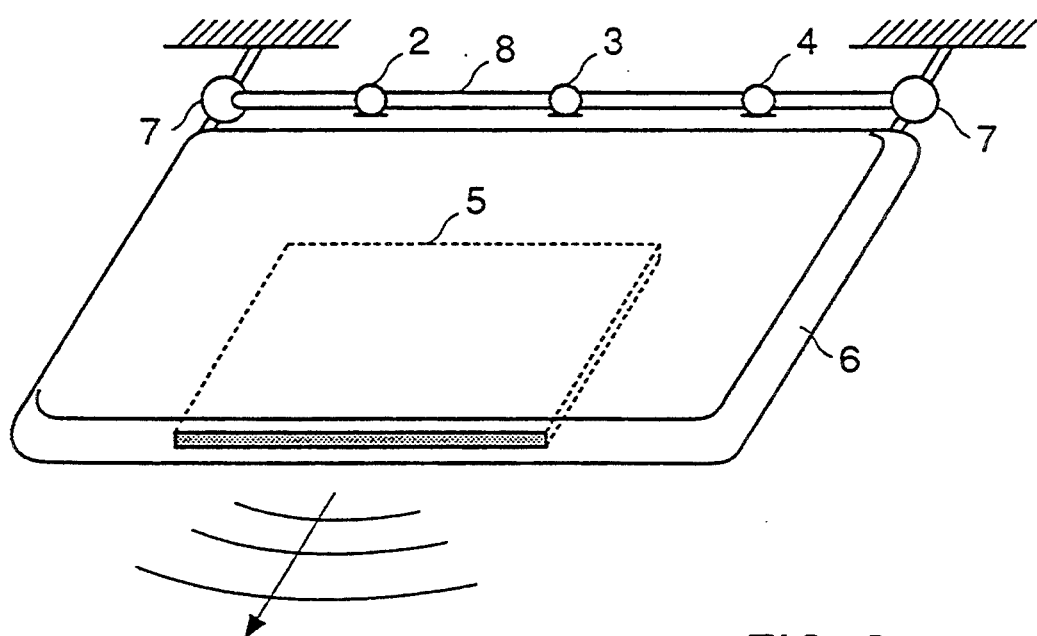
FIG. 2 shows a sun visor arrangement with integrated loudspeaker and integrated microphones.

FIG. 2 shows a sun visor arrangement with integrated loudspeaker 5 and integrated microphones 2, 3, 4. The loudspeaker 5 has been incorporated into a sun visor 6 in such a manner that it radiates from a narrow side of the sun visor 6 which faces the speaker/listener. A flat loudspeaker is depicted here as an embodiment of the loudspeaker 5, for example, a piezoelectric foil loudspeaker. The sun visor 6 is coupled to a supporting member 8, which carries the microphones 2, 3, 4 and which is constructed as a rod, through a transmission 7. The sun visor arrangement is fastened in the interior of a motor vehicle above the windscreen.

The transmission 7 couples the sun visor 6, i.e. the loudspeaker 5, to the microphones 2, 3, 4. A pivoting movement of the sun visor 6 can be transformed into a rotary movement of the microphones 2, 3, 4 arranged on the supporting member 8 by means of this transmission.

Figure 3:
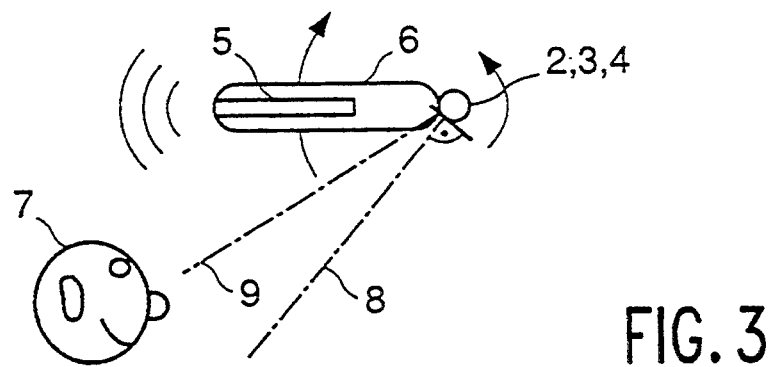
FIGS. 3 and 4 show two possible positions of the sun visor and the microphones.
Figure 4:
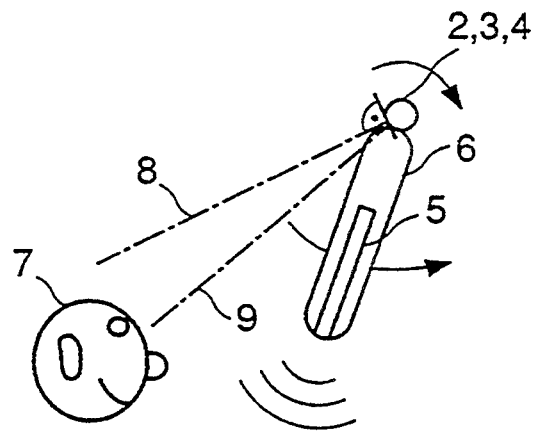

FIGS. 3 and 4 show two possible positions of the sun visor 6 and the microphones 2, 3, 4. Both Figures are side elevations of the sun visor and the microphones and the head 11 of a speaker/listener. A plane 10 represents the main reception direction of the microphones 2, 3, 4. A plane of symmetry 9 intersects the axis of rotation of the microphones 2, 3, 4, about which also the sun visor 6 with integrated loudspeaker 5 is pivoted, and the head 11 of the speaker/listener.

FIG. 3 shows the sun visor 6 in hinged-up position. The sun visor 6 is above the plane of symmetry 9. The main reception direction 10 of the microphones 2, 3, 4 is below the plane of symmetry 9. Since the sun visor and the microphones are coupled by a transmission, the microphones 2, 3, 4 are rotated downwards when the sun visor 6 is pivoted upwards. These pivoting and rotating movements are indicated in the drawing. The main reception direction 10 of the microphones 2, 3, 4 just fails to intersect the sun visor 6. Thus the microphones 2, 3 4 are substantially not screened off from the speaker/listener by the sun visor 6. The sound radiation of the loudspeaker 5 is also indicated. It is apparent that the acoustic feedback into the microphones 2, 3, 4 is reduced to a minimum. This is particularly advantageous when the radiotelephone is used as a hands-free device.

FIG. 4 shows the sun visor 6 in a hinged-down position. The sun visor 6 is below the plane of symmetry 9. With the sun visor 6 in this position, the main reception direction 10 of the microphones 2, 3, 4 lies above the plane of symmetry 9. Pivoting of the sun visor 6 with integrated loudspeaker 5 in downward direction is indicated, as is the simultaneous opposed rotation of the microphones 2, 3, 4. The main reception direction 10 of the microphones 2, 3, 4 does not intersect the sun visor 6 in the case illustrated. An optimized acoustic coupling between the microphones 2, 3, 4, the loudspeaker 5 and the speaker/listener 11 is obtained.

The rotation of the microphones 2, 3, 4 indicated in FIGS. 3 and 4 may be a continuous or a snap-type movement. A snap-type movement of the microphones 2, 3, 4 renders it possible to avoid positions of the microphones 2, 3, 4 and of the sun visor 6 in which the main reception direction 10 of the microphones is cut off by the sun visor 6. These positions occur in particular when the sun visor 6 is directed towards the head 11 of the speaker/listener. The snap-type movement is advantageously triggered when the sun visor 6 moves through the plane of symmetry 9. When the sun visor 6 moves through the plane of symmetry 9 in downward direction, the microphones 2, 3, 4 are so rotated in a snap-type movement that the main reception direction 10 is shifted from a position below the plane of symmetry 9 into a position above the plane of symmetry 9. Pivoting of the sun visor 6 from a position below the plane of symmetry 9 in upward direction, and the associated opposed rotation of the microphones, take place in an analogous manner. The snap-type movement of the microphones 2, 3, 4 is again triggered at the moment when the sun visor 6 moves through the plane of symmetry 9.

Figure 5:
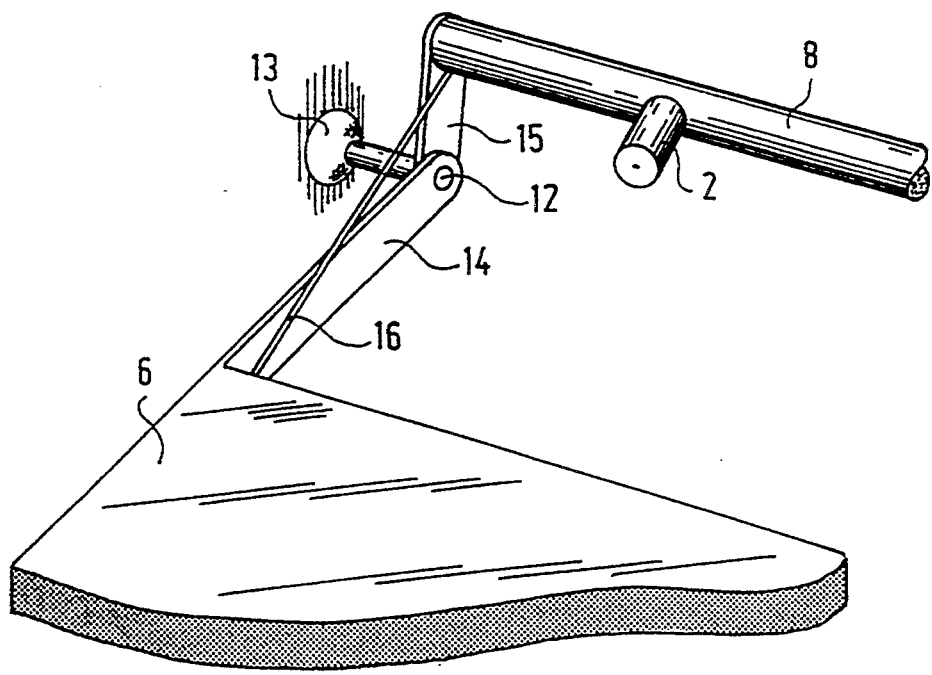
FIG. 5 shows a possibility for coupling the sun visor to a member carrying the microphones.

FIG. 5 indicates a particular coupling possibility between the sun visor 6 and the supporting member 8 by showing a portion of the relevant sun visor arrangement. A bearing 12 rigidly fastened, for example, to the vehicle body 13 is present. A supporting rod 14 of the sun visor 6 as well as a supporting rod 15 of the supporting member 8 are rotatably supported in the bearing 12. The supporting rods 14 and 15 are rigidly connected to the sun visor 6 and the supporting member 8, respectively. An elastic coupling element 16, for example a rubber band or a tension spring, is fastened to the supporting member 8 and to the sun visor 6 in a prestressed state. When the sun visor 6 is pivoted from the upper position shown in FIG. 3 in downward direction, the supporting member 8 will perform a snap-type rotary movement in downward direction when the elastic coupling element 16 crosses the extension of the axis of rotation of the bearing 12, and the direction of the moment of torsion generated by the coupling element 16 and acting on the supporting member is reversed. The main reception direction of the microphones 2, 3, 4 thus switches from below to above, as is desired. The coupling of the sun visor 6 and supporting member 8 to the opposite side is constructed in the same manner.

I claim:

1. A radiotelephone comprising a loudspeaker and at least one microphone, and which is integrated with a vehicular sun visor assembly; the sun visor assembly including a sun visor in the form a substantially rectangular panel having two opposite major sides and two opposite minor sides, and which when mounted in a vehicle is positioned so that a first of said major sides thereof is more remote from an occupant of the vehicle than the second major side thereof, the major and minor sides being narrow in relation to the lengths thereof; the sun visor assembly further including a support member adjoining said first major side of the sun visor and coupled thereto by a coupling which, when the sun visor is pivoted, causes axial rotation of said support member; characterized in that:

the loudspeaker is included in the sun visor, the face of the loudspeaker being in said second major side of the sun visor;

the microphones are supported on said support member so that upon axial rotation of said support member the microphones are rotated therewith, causing tilting of a main reception path between the microphones and an occupant of said vehicle; and said coupling causes said support member to axially rotate in a direction opposed to a pivoting direction of said sun visor, so that a downward pivoting of said sun visor causes an upward tilt of said main reception path and an upward pivoting of said sun visor causes a downward tilt of said main reception path;

whereby regardless of how the sun visor is pivoted it does not acoustically screen the main reception path of the microphones from an occupant of said vehicle.

2. A radiotelephone as claimed in claim 1, wherein during pivoting of the sun visor said support member traverses an annular range within which the main reception path of the microphones is at least partially intercepted by the sun visor, and the coupling between the sun visor and said support member causes said annular range to be traversed with a snap-type movement.

3. A radiotelephone as claimed in claim 1, wherein said coupling is a mechanical transmission.

4. A radiotelephone as claimed in claim 1, wherein said support member is a rod.

* * * * *